United States Patent Office 3,452,549
Patented July 1, 1969

3,452,549
METHOD FOR PRODUCING PREDETERMINED CRYSTAL STRUCTURES
Paul R. Camp, Ann Arbor, Mich., assignor to the United States of America as represented by the Secretary of the Army
No Drawing. Filed Mar. 28, 1966, Ser. No. 538,919
Int. Cl. B01j 17/20, 17/04
U.S. Cl. 62—58         3 Claims

ABSTRACT OF THE DISCLOSURE

A method for producing relatively large crystal structures free of impurities comprising the covering of a portion of a solid element in a liquid so as to form a solid-liquid interface, reducing the temperature of the solid element below the freezing point of the liquid, touching the solid-liquid interface with a single solid crystal of the liquid which is oriented so that the c-axis of the single solid crystal is perpendicular to the solid-liquid interface, warming the solid element to the freezing point of the liquid, extracting heat through the solid element to cool the liquid below its freezing point, and removing the impurities therefrom.

---

The invention described herein may be manufactured and used by or for the Government for governmental purposes, without the payment to me of any royalty thereon.

The subject invention relates to a method of producing crystals of desired size, shape and orientation.

Many processes require crystal growth with definite and predictable characteristics. For example, the purification of water by freezing dictates that the resultant ice have as few grain boundaries as possible. Thus impurities which would normally be trapped at crystal boundaries are eliminated. Another process requiring specific crystal growth for optimum results is freeze separation of water. Such separation may be from foods, biological matter or other particulate matter. Once again water-soluble or suspended impurities may be concentrated by proper crystal growth.

In both processes—water purification and freeze separation—as well as many others relying on similar principles, the desired crystals possess definable characteristics. They should be relatively large. Their c-axis should be perpendicular to the liquid-solid interface. And the growth of the crystals should progress at an even rate presenting a solid, uninterrupted wall parallel to the liquid-solid interface. In this manner, impurities will be gradually pushed out from the melt by the advancing wall of frozen material.

I have discovered that several variables exist which dictate the success or failure of these processes. Manipulation of such variables relative to one another permits the acquisition of the desired results. Specifically, the temperature of the melt, the method of nucleation, the presence and nature of a solid surface adjacent to the melt and the manner of heat removal from the melt, are intimately related.

It is the primary object of the present invention to provide a prescription for attaining specific crystal growth.

It is more particularly an object of the present invention to prescribe a method by which large crystals with their c-axis perpendicular to the liquid-solid interface and their growth presenting a continuous interface may be produced.

The first step in the proposed method is the selection of an appropriate solid-surface upon which to form the crystal structure. In practice such a surface may take the form of a plate, a drum or the like. For water purification or freeze separation systems, Lucite i.e., a mixture of acrylate and methacrylate resins has proven advantageous. It is a material whose surface, I have discovered, favors the formation of large crystallites oriented with their c-axes nearly perpendicular to the water-solid interface. The relevant temperature range for these processes is 0° to —6° centigrade. Since the growth velocity of the mode with the c-axis perpendicular to the liquid-solid interface on Lucite is less than that of the c-parallel mode in the stated temperature range, it is desirable to retard the amount of c-parallel growth by nucleation at the liquid-solid interface with a single crystal whose c-axis is approximately perpendicular to the interface. Some advantage is gained by using an oriented seed but, in general, substantial c-perpendicular growth will evolve regardless of the orientation of the seed.

It is preferable to initiate crystal growth on Lucite at a temperature about —5° centigrade. If the system is allowed to supercool until the occurrence of spontaneous nucleation, considerable c-parallel growth may result, with reduced average crystallite size. Moreover, much dendritic growth out into the liquid will occur, thereby trapping air and impurities between the branches of the dendrites. The preferred temperature range may be narrowed still further since formation above —1° centigrade will result in very slow growth rate across the interface—an undesirable characteristic.

It is necessary that dendrites perpendicular to the interface do not form and that the ice crystals growing out into the liquid present a continuous ice-water interface. In this manner, impurities rejected by the ice may be removed from the region of the interface. Removal may be accomplished by diffusion, circulation, mechanical scrubbing, and other standard processes. To obtain such a continuous ice-water interface a large fraction of the latent heat of fusion must be removed through the Lucite. The precise fraction can be determined by factors such as temperature at the interface, rate of flow of the liquid, and so on. But the safest procedure is to extract most, or as much as possible, of the heat of fusion through this surface.

Total design considerations may dictate the use of a metal as the solid surface, even at the expense of crystallite size. Crystallites of moderate size and smooth ice-water interfaces can be produced on the surfaces of metals such as copper, gold, aluminum, brass, and the like. In general terms, the method would consist of the following. Reduce the surface temperature of the metal to a point below that at which the c-parallel mode dominates (about —1° centigrade for aluminum). If that temperature is close to the cross-over temperature at which the growth velocity of the two modes are about equal, nucleate with a seed oriented so that its c-axis is perpendicular to the metal surface. If the temperature at nucleation is a degree or more below this critical point, orientation of the seed is unimportant. For aluminum, a nucleation temperature of —2° centigrade is satisfactory. Nucleation is accomplished by touching the water-solid interface with an ice crystal. After the interface has been completely covered with initial growth, permit it to warm to nearly 0° centigrade for a time. The length of time will vary with the size of crystallites desired; a longer time yields larger crystallites. Aluminum nucleated at —2° centigrade requires a warming time of approximately fifteen minutes to yield crystallites having an average cross-sectional area of a few square millimeters.

Next, lower the temperature of the metal surface to a point at which the ice sheet thickens at a desired rate. The resulting grain structure will be ordered columnar growth with the axes of the columns perpendicular to the metal.

The method for crystal growth to which the present invention addresses itself, although illustrated in a water-solid contest, may be equally applied to bimetal systems. For example, similar principles will pertain to the growth of tin crystals on iron (galvanization), to the production of ordered iron structures on a material which is solid at the temperature of molten iron, or to the adhesion of germanium crystals to a graphite surface. And, while only preferred forms of the invention are shown and described, other forms of the invention are contemplated and numerous changes and modifications may be made therein without departing from the spirit of the invention as set forth in the appended claims.

What is claimed is:

1. A method for producing relatively large crystal structures free of impurities and dendritic growth, comprising the steps of selecting a solid metal element, covering a portion of said metal element with water containing an impurity, reducing the temperature of said metal element below 0° centigrade, selecting a single crystal of ice, orienting said crystal of ice so that the c-axis of said crystal is perpendicular to the interface of said metal element and said water, touching said interface with said crystal, warming said metal element to 0° C. extracting heat through said metal element to cool said water to below 0° centigrade, and removing the impurities.

2. The method set forth in claim, 1 wherein said metal element is comprised of at least one of the metals from the group consisting of copper, gold, aluminum and brass.

3. The method set forth in claim 1, wherein said metal element consists of aluminum, said temperature reduction is to −2° centigrade and said warming time is approximately fifteen minutes.

References Cited

UNITED STATES PATENTS

| | | | |
|---|---|---|---|
| 2,184,112 | 12/1939 | Blomquist | 249—71 |
| 2,386,979 | 10/1945 | Rundell | 249—71 |
| 2,558,015 | 6/1951 | Storer | 249—71 |
| 2,793,941 | 5/1957 | Estes | 23—301 |
| 2,895,812 | 7/1959 | Kohman | 23—273 |
| 2,904,512 | 9/1959 | Horn | 23—301 |
| 2,778,205 | 1/1957 | Berger | 62—58 |
| 2,800,000 | 7/1957 | Berger | 62—58 |
| 2,896,418 | 7/1959 | Berger | 62—58 |

NORMAN YUDKOFF, *Primary Examiner.*

U.S. Cl. X.R.

23—301